United States Patent
Yang et al.

(10) Patent No.: US 9,904,114 B2
(45) Date of Patent: Feb. 27, 2018

(54) LIQUID CRYSTAL DISPLAY PANEL

(71) Applicant: Innolux Corporation, Miao-Li County (TW)

(72) Inventors: Ching-Che Yang, Miao-Li County (TW); Chen-Kuan Kao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 14/851,159

(22) Filed: Sep. 11, 2015

(65) Prior Publication Data

US 2016/0077384 A1    Mar. 17, 2016

(30) Foreign Application Priority Data

Sep. 12, 2014 (TW) ............................ 103131523 A

(51) Int. Cl.
*G02F 1/1333* (2006.01)
*G02F 1/1337* (2006.01)

(52) U.S. Cl.
CPC ............... *G02F 1/133723* (2013.01); *G02F 2001/133742* (2013.01); *G02F 2001/133773* (2013.01); *G02F 2202/023* (2013.01)

(58) Field of Classification Search
CPC ... G02F 1/133723; G02F 2001/133742; G02F 2001/133773
USPC ........................................................ 349/158
See application file for complete search history.

(56) References Cited

U.S. PATENT DOCUMENTS

| | | | | |
|---|---|---|---|---|
| 5,781,262 A | * | 7/1998 | Suzuki | G02F 1/133753 349/111 |
| 5,856,859 A | * | 1/1999 | Itoh | G02F 1/13725 349/165 |
| 6,157,428 A | * | 12/2000 | Koma | G02F 1/133345 349/123 |
| 8,619,222 B2 | | 12/2013 | Nakamura et al. | |
| 9,235,084 B2 | | 1/2016 | Miyakawa et al. | |
| 2009/0237605 A1 | * | 9/2009 | Nagae | G02F 1/133734 349/125 |

(Continued)

FOREIGN PATENT DOCUMENTS

CN    102650766 A    8/2012
CN    102650767 A    8/2012

OTHER PUBLICATIONS

TIPO Office Action dated Nov. 3, 2015 in corresponding Taiwan application (No. 103131523).

*Primary Examiner* — Lucy Chien
(74) *Attorney, Agent, or Firm* — McClure, Qualey & Rodack, LLP

(57) ABSTRACT

A liquid crystal display (LCD) panel having at least one pixel area is provided. The LCD panel includes a first electrode layer, a second electrode layer and a liquid crystal layer. The first electrode layer and the second electrode layer are disposed in the pixel area. The liquid crystal layer is disposed between the first electrode layer and the second electrode layer. The liquid crystal molecules of the liquid crystal layer disposed adjacent to the first electrode layer have a first pre-tilt angle, and the liquid crystal molecules of the liquid crystal layer disposed adjacent to the second electrode layer have a second pre-tilt angle different from the first pre-tilt angle.

8 Claims, 5 Drawing Sheets

(56) References Cited

U.S. PATENT DOCUMENTS

2012/0314168 A1   12/2012  Kang et al.
2013/0321740 A1*  12/2013  An ....................... H05K 5/0217
                                                                      349/58

* cited by examiner

LIQUID CRYSTAL DISPLAY PANEL

This application claims the benefit of Taiwan application Serial No. 103131523, filed Sep. 12, 2014, the subject matter of which is incorporated herein by reference.

BACKGROUND

Field of the Invention

The invention relates in general to a display device, and more particularly to a curved liquid crystal display (LCD) panel.

Description of the Related Art

Flat panel display (FPD), having the advantages of lightweight, low power consumption and no radiation, has gradually replaced conventional cathode ray tube (CRT) display device and become widely used in various electronic products. As the design of consumer electronic products is directed towards aesthetic design focused more on novelty and fashion from functional design, liquid crystal display (LCD) device with curved surface is provided by the industries.

During the manufacturing process of a flat LCD panel, a polyimide (PI) alignment film or a polymer-stabilized alignment (PSA) film containing curable reactive monomer is formed on each of the two sides of the liquid crystal layer by using optical alignment technology. When a stress is applied to glass substrates, the optical axes of the liquid crystal molecules anchored on the polyimide (PI) alignment film or the polymer-stabilized alignment (PSA) are dislocated, and an inverse domain is normally generated at the boundary between adjacent alignment domains. Let a multi-domain vertically alignment (MVA) LCD panel having wide viewing angle be taken for example. When the liquid crystal molecules anchored on the polymer stabilized alignment layer are dislocated, the optical axis of the liquid crystal molecules will generate an inverse domain at the boundary between adjacent alignment domains, generating extra dark fringes at the boundary of the alignment domain generate, and severely deteriorating the display quality of the LCD panel.

Similar problems also occur to the curved liquid crystal display device. According to the generally known method of manufacturing curved liquid crystal display device, a stress is directly applied to the flat LCD panel and makes the LCD panel in a curved state. The sides of the curved LCD panel have at least one curvature radius. When a stress is applied to the flat LCD panel and makes the glass substrates curved, the two glass substrates of the curved LCD panel will have different curvatures, and relative positions of the two glass substrates perpendicular to the light output surfaces will be shifted, causing the optical axis of the anchored liquid crystal molecules more severely dislocated, the display quality of the curved LCD panel is more severely affected than the display quality of the flat LCD panel.

Therefore, it has become a prominent task for the industries to provide an advanced LCD panel capable of resolving the problems encountered in the prior art.

SUMMARY

According to one embodiment of the present invention, a liquid crystal display (LCD) panel has at least one pixel area and includes a first electrode layer, a second electrode layer and a liquid crystal layer. The first electrode layer and the second electrode layer are disposed in the pixel area. The liquid crystal layer is disposed between the first electrode layer and the second electrode layer. The liquid crystal molecules of the liquid crystal layer disposed adjacent to the first electrode layer have a first pre-tilt angle, the liquid crystal molecules of the liquid crystal layer disposed adjacent to the second electrode layer have a second pre-tilt angle substantially different from the first pre-tilt angle.

According to another embodiment, an LCD panel has at least one pixel area and includes a first electrode layer, a second electrode layer, a liquid crystal layer, a first polymer film and a second polymer film. The first electrode layer and the second electrode layer both are disposed in the pixel area. The liquid crystal layer is disposed between the first electrode layer and the second electrode layer. The first polymer film is disposed between the liquid crystal layer and the first electrode layer and contacts the liquid crystal layer. The second polymer film is disposed between the liquid crystal layer and the second electrode layer and contacts the liquid crystal layer. The infra-red (IR) light absorption spectra of the first polymer film and the second polymer film have different characteristic absorption peaks within the wavenumber range of 800 $cm^{-1}$~2000 $cm^{-1}$.

According to another embodiment, the LCD panel is a curved LCD panel. The curved LCD panel has a curved first side having at least one curvature radius between 500~10000 mm.

According to another embodiment, an LCD panel has at least one pixel area and includes a first electrode layer, a second electrode layer and a liquid crystal layer. The first electrode layer and the second electrode layer both are disposed in the pixel area. The liquid crystal layer is disposed between the first electrode layer and the second electrode layer, and includes a plurality of first liquid crystals with a first alignment direction and a plurality of second liquid crystals with a second alignment direction. In the pixel area, the area occupied by the second liquid crystals is larger than that occupied by the first liquid crystals, and an asymmetric alignment domains region is formed by the first and the second liquid crystals. When the LCD panel is in a brightest state, the asymmetric alignment domains region includes only one dark fringe having a brightness value lower than 75% of the maximum brightness value of the LCD panel in the brightest state.

Based on the above disclosure, an LCD panel is provided in an embodiment of the invention. Two electrode layers are formed on two opposite surfaces of two glass substrates of the LCD panel, and two types of polymer films are respectively formed on the electrode layers for aligning the liquid crystal layer disposed between the two electrode layers. Since the two types of polymer films have different chemical compositions, the liquid crystal molecules of the liquid crystal layer disposed adjacent to the two sides respectively have different pre-tilt angles. In some embodiments of the invention, the liquid crystal molecules disposed adjacent to the electrode layer with a larger aperture density have a smaller pre-tilt angle. In some other embodiments of the invention, the difference in the chemical compositions of the two types of polymer films can be verified through the characteristic absorption peaks of the IR light absorption spectrum within the wavenumber range of 800 $cm^{-1}$~2000 $cm^{-1}$.

During conventional manufacturing process, when the glass substrates receive a stress, the optical axis of the anchored liquid crystal molecules is dislocated, and an inverse domain is generated at the boundary between adjacent asymmetric alignment domains. In some embodiments of the invention, the two types of polymer films are used in a multi-domain vertically alignment (MVA) LCD panel with wide viewing angle. In some embodiments, the LCD panel in which the liquid crystal molecules of the electrode layers disposed adjacent to the two sides of the LCD panel have different pre-tilt angles resolves the problems occurring during the manufacturing process of the generally known LCD panel.

According to some embodiments, when the LCD panel is in a brightest state, in the boundary between adjacent asymmetric alignment domains, only one dark fringe having low brightness is present, and no extra dark fringes having such low brightness is present. Low brightness means a brightness value lower than 75% of the maximum brightness value of the LCD panel in the brightest state, For example, low brightness means a brightness value between 60% to 75%, or between 65% to 70%, of the maximum brightness value of the LCD panel in the brightest state. Thus, the problem of the generally known LCD panel having poor display quality can be resolved. If the technical features disclosed in the invention are used in the curved LCD panel, the display quality of the generally known LCD panel can be significantly improved.

The above and other aspects of the invention will become better understood with regard to the following detailed description of the preferred but non-limiting embodiment(s). The following description is made with reference to the accompanying drawings.

DETAILED DESCRIPTION OF THE INVENTION

The invention provides a liquid crystal display (LCD) panel for resolving the problems of a generally known LCD panel having poor display quality. The above and other objects, features and advantages of the present invention will become better understood with reference to a number of exemplary embodiments disclosed below with accompanying drawings.

It is to be understood that the specific implementations and methods disclosed below are not for limiting the invention, which can also be implemented by using other features, components, methods and parameters. The exemplary embodiments disclosed below are for exemplifying the technical features of the invention only, not for limiting the scope of protection of the invention. Anyone who is skilled in the technology field of the technology will be able to make equivalent modification and variations according to the descriptions of the specification without violating the spirit of the invention. For components common to different embodiments and drawings, the same numeric designations are used.

Figure 1A:
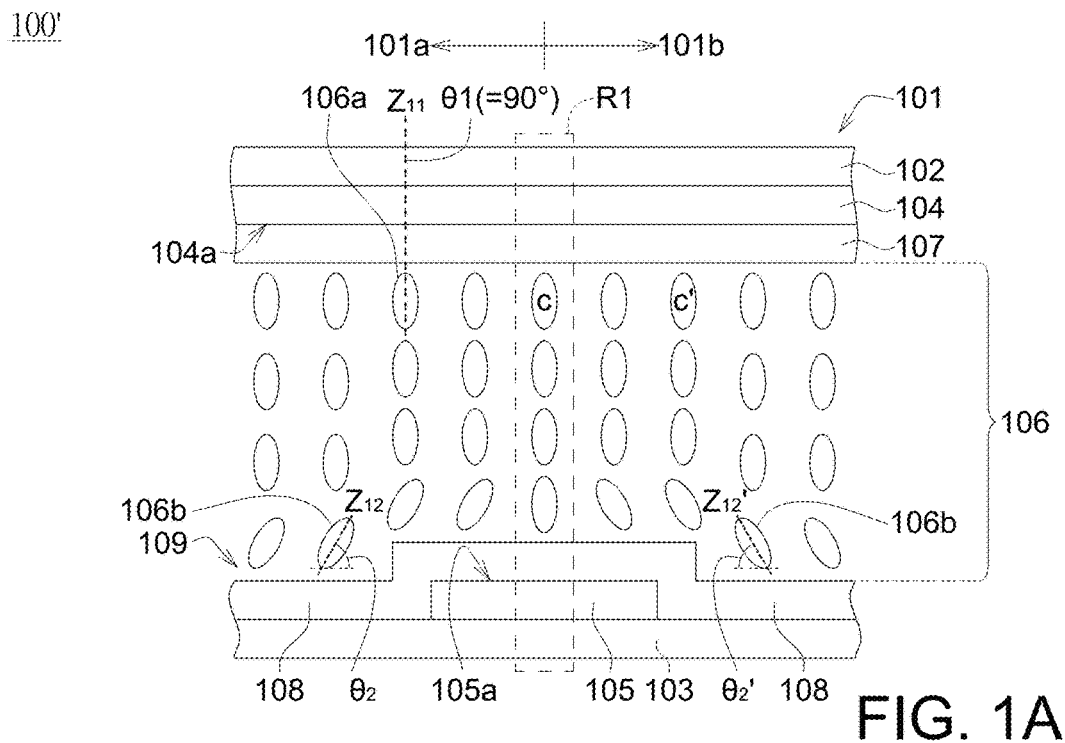
FIG. 1A is a cross-sectional view of the structure of a flat LCD panel used for forming a curved LCD panel according to an embodiment of the invention.

The manufacturing method of the curved LCD panel 100 includes following steps. Firstly, a flat LCD panel 100' having at least one pixel area (such as pixel area 101) is provided. Next, the flat LCD panel 100' is curved by a stress. Referring to FIG. 1A, FIG. 1A is a cross-sectional view illustrating the structure of a flat LCD panel 100' used for forming a curved LCD panel 100 according to an embodiment of the invention.

In some embodiments of the invention, the flat LCD panel 100' can be realized by a multi-domain vertically alignment (MVA) LCD panel. The flat LCD panel 100' includes a first substrate 102, a second substrate 103, a first electrode layer 104, a second electrode layer 105, a liquid crystal layer 106, a first polymer film 107 and a second polymer film 108.

In some exemplary embodiments of the invention, the first substrate 102 and the second substrate 103 can be realized by (but not limited to) two glass substrates parallel to each other. The first electrode layer 104 and the second electrode layer 105 are disposed on the first substrate 102 and the second substrate 103 respectively, and the first electrode layer 104 faces towards the second electrode layer 105. The first electrode layer 104 and the second electrode layer 105 preferably are formed of indium tin oxide (ITO). The first substrate 102 can be a color filter substrate, and the second substrate 103 can be a TFT array substrate. Or, alternatively, the first substrate 102 can be a TFT array substrate, and the second substrate 103 can be a color filter substrate.

The first polymer film 107 is formed on the first electrode layer 104. The second polymer film 108 is formed on the second electrode layer 105. The first polymer film 107 faces towards the second polymer film 108. The first polymer film 107 and the second polymer film 108 can be formed of the same or different material. In some embodiments of the invention, the first polymer film 107 and the second polymer film 108 can be polyimide (PI) films.

The liquid crystal layer 106 is disposed between the first polymer film 107 and the second polymer film 108. In some embodiments of the invention, the first polymer film 107 is formed on the surface 104a of the first electrode layer 104 facing towards the second electrode layer 105 and directly contacts the liquid crystal molecules of the liquid crystal layer 106. The second polymer film 108 is formed on the surface 105a of the second electrode layer 105 facing towards the first electrode layer 104 and directly contacts the liquid crystal molecules of the liquid crystal layer 106.

In some embodiments of the invention, the first electrode layer 104 and the second electrode layer 105 both are disposed in the pixel area 101 of the flat LCD panel 100'. For explanatory and descriptive purposes, one single pixel area 101 of the flat LCD panel 100' is exemplified below. In greater details, the pixel area 101 is a smallest display unit of the flat LCD panel 100'. The flat LCD panel 100' includes at least one pixel array composed of a plurality of pixel areas 101. Each pixel area 101 in the pixel array can be defined by a black matrix (not illustrated) covering the first substrate 102.

In some embodiments of the invention, the first electrode layer 104 can be realized by a common electrode in the pixel area 101 of the flat LCD panel 100'. The second electrode layer 105 can be realized by a pixel electrode in the pixel area 101. The first electrode layer 104 disposed in the pixel area 101 can have a complete surface, and no slits and apertures are formed. The second electrode layer 105 disposed in the pixel area 101 can have a plurality of slits 109 or apertures, thus forming a patterned second electrode layer.

However, the embodiments of the invention are not limited to the above exemplifications. In some other embodiments of the invention, the surface of the first electrode layer 104 may also have at least one slit or aperture (not illustrated). The aperture density of the slits or apertures on the surface of the second electrode layer 105 (the ratio of the area of the slits or apertures to the area of the second electrode layer 105) can be greater than the aperture density of the slits or apertures on the surface of the first electrode layer 104. That is, the area of the slits 109 or apertures that are formed on a unit area of the surface of the second electrode layer 105 is larger than that formed on the surface of the first electrode layer 104. In some other embodiments of the invention, the second electrode layer 105 with a larger aperture density can be realized by a common electrode in the pixel area 101 of the flat LCD panel 100', and the first electrode layer 104 with a smaller aperture density can be realized by a pixel electrode in the pixel area 101 of the flat LCD panel 100'.

In the present embodiment, the patterned second electrode layer 105 can be used serving as domain regulators of the liquid crystal layer 106 for adjusting the orientation of the liquid crystal molecules in the pixel area 101. For example, the liquid crystal molecules in the pixel area 101 can be aligned in a tilting manner and divide one single pixel area 101 into a plurality of sub-pixel areas such as a first sub-pixel area 101a and a second sub-pixel area 101b. When a voltage is applied to one single pixel area 101, a plurality of (at least two) alignment domains with different orientations can be formed, and a wide angle of view can be achieved. Alternatively, in some embodiments, the slits 109 can also be used as domain regulators of the liquid crystal layer 106 for adjusting the orientation of the liquid crystal molecules in the pixel area 101.

In greater details, in one hand, because the liquid crystal molecules of the liquid crystal layer 106 are affected by the topography of the surface of the slits 109, the optical axes Z12 and Z12' of the liquid crystal molecules 106b disposed adjacent to the second electrode layer 105 may be tilted in different directions in the first sub-pixel area 101a and the second sub-pixel area 101b respectively. In other hand, since the second polymer film 108 includes a plurality of curable molecules (for example, reactive monomers) that can be cured in a photo-curing or heat-curing step, thus the tilted optical axes Z12 and Z12' of the liquid crystal molecules may be anchored and maintained in a tilting direction.

In some embodiments of the invention, the first electrode layer 104 and the second electrode layer 105 both have a complete surface. In this case, the alignment process of the first electrode layer 104 and the second electrode layer 105 includes following steps. Different electric fields (voltage) are applied to different regions (such as the first sub-pixel area 101a and the second sub-pixel area 101b) of the pixel area 101, so that the optical axes (such as optical axes Z12 and Z12') of the liquid crystal molecules in different regions are rotated and have different tilting directions, and respectively form an angle with the second substrate 103. Meanwhile, the second polymer film 108 is radiated by a light (such as a ultra-violet (UV) light) or is heated, such that curable reactive monomers in the second polymer film 108 are cross-linked, and the tilted optical axes Z12 and Z12' of the liquid crystal molecules 106b of the liquid crystal layer 106 disposed adjacent to the second electrode layer 105 (the second polymer film 108) are anchored. When the voltages applied to the pixel area 101 are removed, the angles formed between the anchored optical axes Z12 and Z12' and the first substrate 102 will remain unchanged.

In greater details, in some embodiments of the invention, before the alignment process is performed, the polyimide material of the first polymer film 107 and the second polymer film 108 can be conformally blanketed on the surface 104a of the first electrode layer 104 and the surface 105b of the second electrode layer 105 respectively by way of spin coating or printing. The polyimide material of the second polymer film 108 is mixed with curable reactive monomers, while the polyimide material of the first polymer film 107 does not contain any curable reactive monomers. Alternatively, according to another embodiment, the polyimide material of the first polymer film 107 is mixed with curable reactive monomers, while the polyimide material of the second polymer film 108 does not contain any curable reactive monomers.

The alignment process of the first polymer film 107 can be implemented by way of directional rubbing which forms micro-trenches (not illustrated) on the surface of the polyimide film to guide the liquid crystal molecules 106a of the liquid crystal layer 106 to align along the rubbing direction. The alignment process can be implemented by another way, the polyimide film containing photo-curing polymers can be radiated by a polarized UV light, such that the molecular chain can be broken and rearranged, in a manner of forming micro-trenches on the surface, and the liquid crystal molecules can be aligned. The alignment process can be implemented by yet another way, the polyimide film can be radiated by a high-energy laser beam or an ion beam in a particular direction, such that the surface can be detached, trenches can be created on the surface, and the liquid crystal molecules can be aligned. The alignment process can be implemented by yet another way, the liquid crystal layer or the polymer film can be mixed with reactive monomers, and a voltage can be applied to guide the alignment direction of liquid crystal molecules, meanwhile the reactive monomers can be reacted by applying photo or heat energy, and a pre-tilt angle of alignment can be achieved.

Since the pre-tilt angle of the first polymer film 107 is aligned with the liquid crystal layer 106, the optical axis $Z_{11}$ of the part of the liquid crystal molecules 106a disposed adjacent to the first polymer film 107 will not be anchored. It should be noted that the alignment process of the first polymer film 107 is not limited thereto, and any processes enabling the first polymer film 107 to generate a pre-tilt angle with respect to the liquid crystal layer 106 will do.

The alignment process of the second polymer film 108 can be implemented by irradiating a UV light on or heating the second polymer film 108 for enabling curable reactive monomers of the second polymer film 108 to be polymerized with the part of the liquid crystal molecules 106b disposed adjacent to the second polymer film 108, such that the optical axes Z12 and Z12' of the liquid crystal molecules 106b disposed adjacent to the second electrode layer 105 (the second polymer film 108) are anchored and respectively form a predetermined angle with the second substrate 103 such as angles $\theta_2$ and $-\theta_2'$ (referred as pre-tilt angle $\theta_2$ and $-\theta_2'$ hereinafter).

In the present embodiment, the first polymer film 107 and the second polymer film 108 are formed of polyimide, it is difficult to differentiate the two types of polymer films according to physical structure. However, since only the second polymer film 108 is mixed with curable reactive monomers, the difference in the chemical compositions of the two types of polymer films still can be differentiated through the analysis of IR light absorption spectrum.

Figure 2:
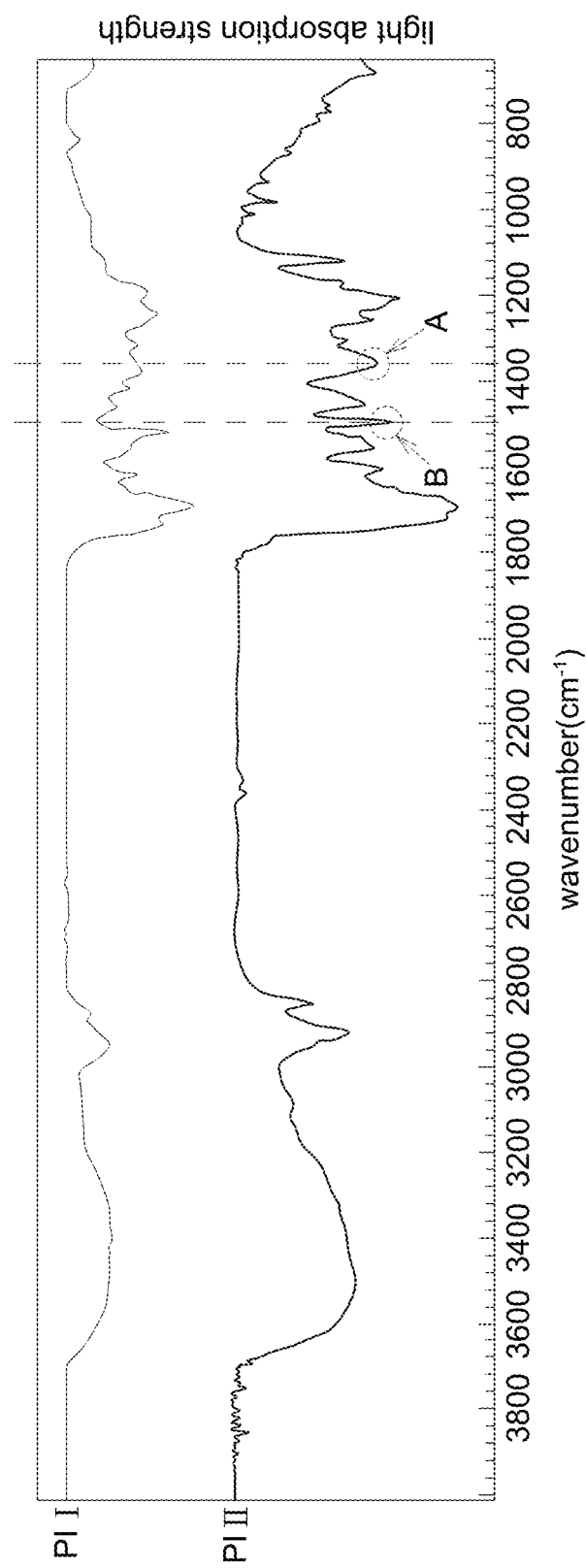
FIG. 2 is an infrared absorption spectrum diagram of two types of polyimide polymer films according to an embodiment of the invention.

Referring to FIG. 2, an infrared absorption spectrum diagram of two types of polyimide polymer films according to an embodiment of the invention is shown. As indicated in FIG. 2, within the wavenumber range of 2000 cm$^{-1}$~4000 cm$^{-1}$, the IR light absorption spectra of the two types of polyimide polymer films (line PI I represents the IR light absorption spectrum of the first polymer film 107; line PI II represents the IR light absorption spectrum of the second polymer film 108) substantially have identical characteristic absorption peaks but the absorption strengths are different. The difference in absorption strength could be ascribed to the terms and conditions of the manufacturing process.

Within the wavenumber range of 800 cm$^{-1}$~2000 cm$^{-1}$, it is evident that the first polymer film 107 and the second polymer film 108 have different characteristic absorption peaks. This particular range of the IR light absorption spectrum clearly shows the difference in the nature of polyimide monomers between the first polymer film 107 and the second polymer film 108. For example, as indicated in the IR light absorption spectrum, the characteristic absorption peaks A and B of line PI II appear within the corresponding wavenumbers range of 1368 cm$^{-1}$ and 1490 cm$^{-1}$ respectively, but the line PI I of the IR light absorption spectrum corresponding to the same wavenumbers does not have any characteristic absorption peaks. This shows that the polyimide monomer of the second polymer film 108 is different from that of the first polymer film 107.

As indicated in the IR light absorption spectrum, the characteristic absorption peak A corresponding to the wavenumber of 1368 cm$^{-1}$ represents a C—H bond, and the characteristic absorption peak B corresponding to the wavenumber of 1720 cm$^{-1}$ represents a C=C bond. The difference between line PI I and line PI II lies in that the polyimide monomer forming the second polymer film 108 further includes other bonds cross-linked with curable reactive monomers. However, the method for detecting chemical compositions of the two types of polymer films is not limited to the above exemplification. Any methods capable of determining the difference between the chemical compositions of the two types of polymer films or capable of detecting the curable reactive monomers are within the spirit and scope of the invention.

Refer to FIG. 1A again. The liquid crystal layer 106 aligned by the first polymer film 107 and the second polymer film 108 can be realized by a homogeneous liquid crystal layer, a homeotropic liquid crystal layer or a twisted liquid crystal layer. A pre-tilt angle $\theta_1$ is formed between the optical axis Z11 of the liquid crystal molecules 106a of the liquid crystal layer 106 disposed adjacent to the first electrode layer 104 and the first substrate 102. In the first sub-pixel area 101a, a pre-tilt angle $\theta_2$ is formed between the optical axis Z12 of the liquid crystal layer 106 disposed adjacent to the second electrode layer 105 and the second substrate 103. In the second sub-pixel area 101b, a pre-tilt angle $-\theta_2$ is formed between the optical axis Z12' and the second substrate 103. According to an embodiment, the pre-tilt angle $\theta_1$ is different from the pre-tilt angle $\theta_2$. The pre-tilt angle $\theta_1$ can be substantially equal to 90°, for example, between 89.9°~90°. The pre-tilt angle $\theta_2$ can be substantially smaller than 89.9° and be smaller than the pre-tilt angle $\theta_1$. In some embodiments of the invention, the pre-tilt angle $\theta_2$ is substantially greater than or equal to 80° but less than 89.9°.

In the present embodiment, the first polymer film 107 is a vertical alignment film. When no voltage is applied to the liquid crystal layer 106, pre-tilt angles $\theta_2$ and $-\theta_2$ are respectively formed between the optical axes Z12 and Z12' of the liquid crystal molecules 106b of the liquid crystal layer 106 disposed adjacent to the second electrode layer 105 (the second polymer film 108) and the second substrate 103. In other words, the pre-tilt angle $\theta_1$ formed between the optical axis $Z_{11}$ of the liquid crystal molecules 106a of the liquid crystal layer 106 disposed adjacent to the first electrode layer 104 and the first substrate 102 is near homeotropic (vertically aligned).

When a voltage is applied to the liquid crystal layer 106, the optical axes Z12 and Z12' of the liquid crystal molecules 106b in the first sub-pixel area 101a and the second sub-pixel area 101b will tilt towards different directions, such that the liquid crystal molecules have different liquid crystal directions in the first sub-pixel area 101a and the second sub-pixel area 101b respectively. For example, the optical axis of the liquid crystal molecules in the first sub-pixel area 101a is directed towards top right and bottom left, and the optical axis of the liquid crystal molecules in the second sub-pixel area 101b is directed towards top left and bottom right to form a plurality of (at least two) alignment domains with different orientations. Furthermore, a boundary of inverse tilted liquid crystal molecules is formed at a boundary region $R_1$ (as indicated by border lines). In the present embodiment, when a voltage is applied to the liquid crystal molecules, the liquid crystal molecules disposed at the boundary region $R_1$ (as indicated by border lines) between two adjacent alignment domains (the first sub-pixel area 101a and the second sub-pixel area 101b) in the pixel area 101 are not affected by the electric fields of the first electrode layer 104 and the second electrode layer 105, and the optical axes of the liquid crystal molecules are perpendicular with the first substrate 102 and the second substrate 103 respectively.

Figure 1B:
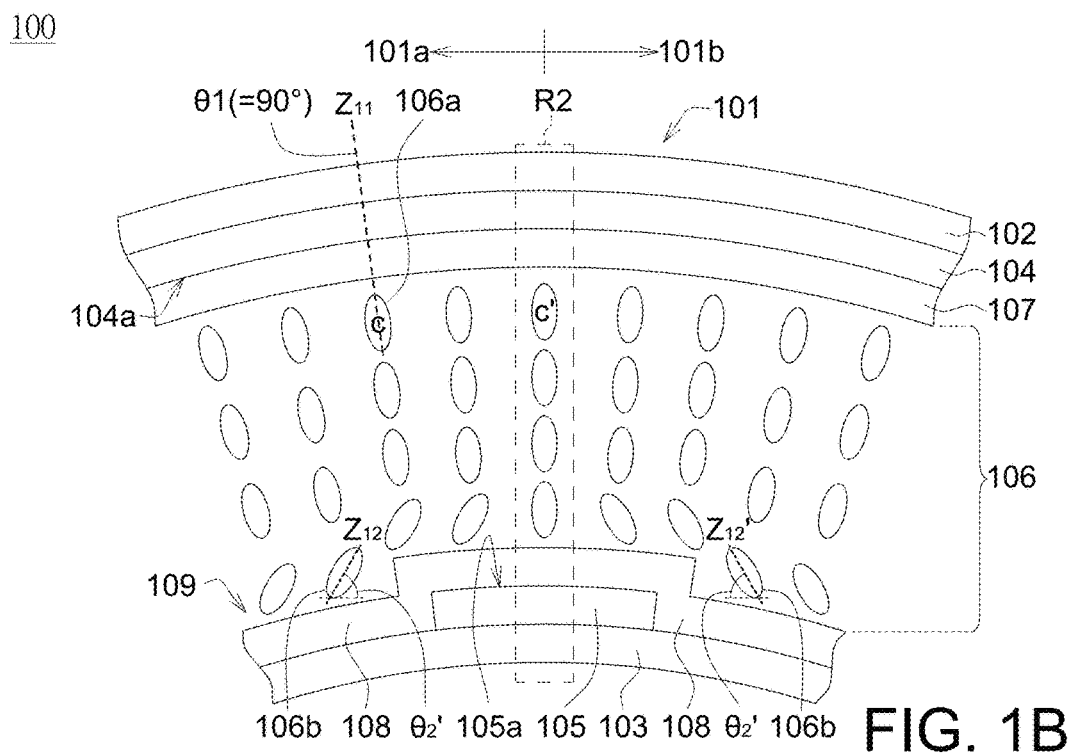
FIG. 1B a cross-sectional view of the structure of a curved LCD panel formed by curving the flat LCD panel of FIG. 1A.

Referring to FIG. 1B, a cross-sectional view of the structure of a curved LCD panel 100 formed by curving the flat LCD panel 100' of FIG. 1A is shown. The first substrate 102 and the second substrate 103 have different curvatures when the flat LCD panel 100' is curved by a stress. Except for the arc center of the curved surface, the relative positions of the first substrate 102 and the second substrate 103 that are originally perpendicular to each other in the planar status will be relatively displaced (for example, LC molecules c and c' are shift to the left), such that the liquid crystal molecules of the liquid crystal layer 106 are accordingly displaced and rearranged along with the displacement of the first substrate 102 and the second substrate 103. However, since most of the liquid crystal molecules are not anchored by the second polymer film 108, thus except for the liquid crystal molecules 106b disposed adjacent to and anchored by the second polymer film 108, the liquid crystal alignment of the remaining liquid crystal molecules of the liquid crystal layer 106 including the liquid crystal alignment of the first polymer film 107 are still homeotropic, and will not be misaligned when the first substrate 102 and the second substrate 103 are relatively displaced by a stress.

According to an embodiment, in the curved LCD panel 100 of FIG. 1B, the first substrate 102 can be a color filter substrate, and the second substrate 103 can be an array substrate. The first pre-tilt angle θ1 is greater than the second pre-tilt angle θ2. The first pre-tilt angle θ1 can be substantially equal to 90 degrees, for example, between 89.9~90 degrees. The second pre-tilt angle can be between 89.9 and 80 degrees. Alternatively, according to another embodiment, the first substrate 102 can be an array substrate, and the second substrate 103 can be a color filter substrate.

In some embodiments of the invention, an inwardly curved side of the curved LCD panel 100 has a curvature radius of 50~10000 mm. For example, in the present embodiment, the second substrate 103 of the curved LCD panel 100 curved by a stress has a curvature radius of 750 mm. In some other embodiments of the invention, the curved LCD panel 100 can be curved in different directions at different positions. For example, the center point of the second substrate 103 which is curved by a stress can be protruded outwardly or concaved inwardly. In some other embodiments, the curved LCD panel 100 can have more than one curved surface. For example, in some embodiments of the invention, the second substrate 103 can be curved inwardly for a distance and then curved outwardly, such that the surface of the curved LCD panel 100 can have at least two arced surfaces like a corrugated terrain structure. Regardless whether the first substrate 102 and the second substrate 103 are curved inwardly or outwardly, the curvature radius of the first substrate 102 can be identical with or different from that of the second substrate 103.

In greater details, because the liquid crystal molecules 106a directly contacting the first polymer film 107 are not anchored. Therefore, when the first substrate 102 and the second substrate 103 are relatively displaced by a stress, the liquid crystal molecules 106a are not affected, and the optical axis $Z_{11}$ of the liquid crystal molecules 106a is still homeotropic along the surface of the first polymer film 107. In other words, the tilted direction of the optical axis $Z_{11}$ of the liquid crystal molecules 106a is perpendicular to the first substrate 102, and the pre-tilt angle $\theta_1$ of the liquid crystal molecules 106a substantially is still equivalent to 90°.

Moreover, since the optical axis $Z_{12}$ of the liquid crystal molecules 106b directly contacting the second polymer film 108 is anchored on the second polymer film 108, thus when the first substrate 102 and the second substrate 103 are relatively displaced by a stress, the liquid crystal molecules 106b disposed adjacent to the second electrode layer 105 (the second polymer film 108) will be relatively displaced along with the second substrate 103 (shifted towards to left as indicated in FIG. 1B). As a result, the pre-tilt angles between the optical axes Z12 and Z12' of the displaced liquid crystal molecules 106b and the second substrate 103 are still $\theta_2$ and $-\theta_2$ respectively and, the pre-tilt angles formed between the optical axis of the rearranged liquid crystal molecules and the first substrate 102 and the second substrate 103 are not changed after the first substrate 102 and the second substrate 103 are displaced.

The mere difference between the curved LCD panel 100 and the flat LCD panel 100' (which has not yet been displaced by a stress) is that the boundary between two adjacent alignment domains in the pixel area 101 is shifted to the boundary region R2 of FIG. 1B from the boundary region R1 of FIG. 1A. Thus when a voltage is applied to the curved LCD panel 100 to display images, the boundary region R2 between two adjacent alignment domains does not generate extra dark fringes. After the boundary region between two adjacent alignment domains is shifted, the number of dark fringes occurring at the boundary region R2 is the same as the number of dark fringes occurring at the boundary region R1 (prior to displacement), so that the display quality in the pixel area 101 is not affected.

Figure 3A:
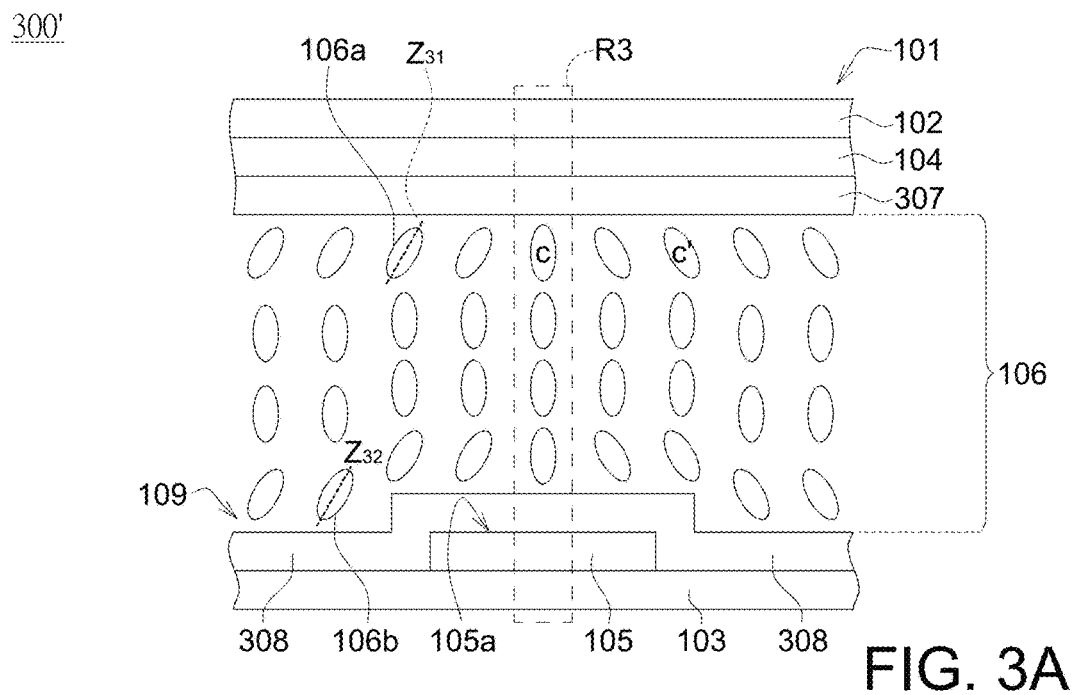
FIG. 3A is a cross-sectional view of the structure of a flat LCD panel used for forming a curved LCD panel according to the prior art.
Figure 3B:
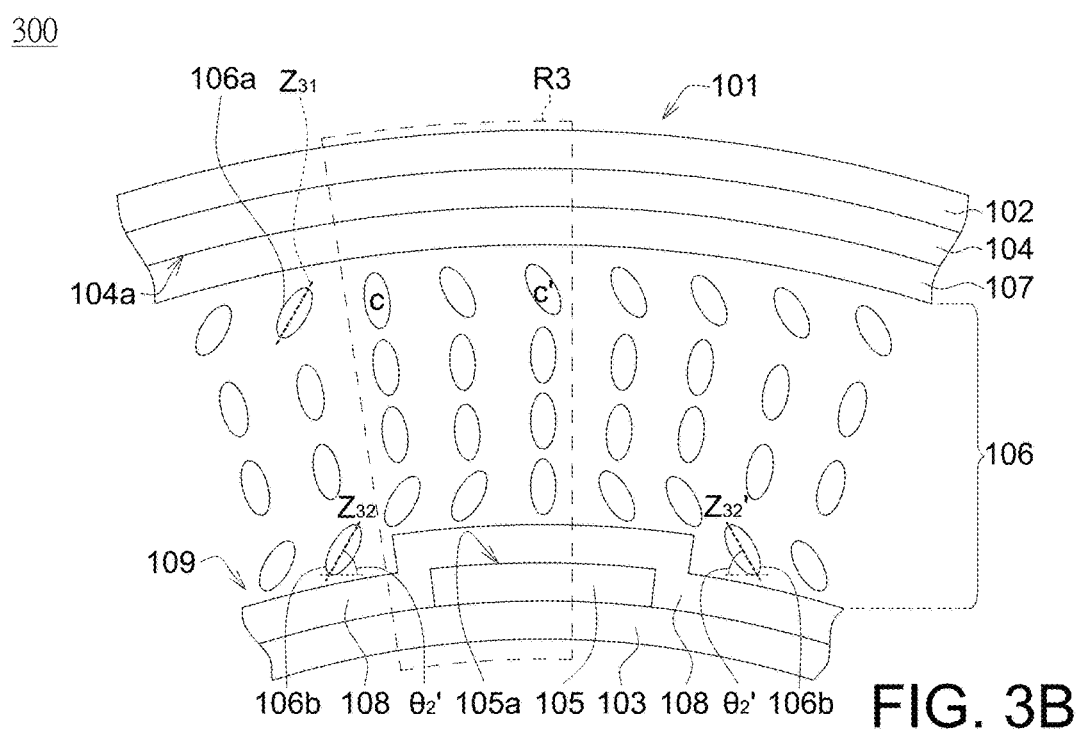
FIG. 3B a cross-sectional view of the structure of a curved LCD panel formed by curving the flat LCD panel of FIG. 3A.

A comparison between a generally known flat LCD panel 300' and a curved LCD panel 300 is disclosed below. Refer to FIGS. 3A-3B. FIG. 3A is a cross-sectional view of the structure of a flat LCD panel 300' used for forming a curved LCD panel 300 according to the prior art. FIG. 3B is a cross-sectional view of the structure of a curved LCD panel 300 formed by curving the flat LCD panel 300' of FIG. 3A. The structure of the flat LCD panel 300' is basically similar with the structure of the flat LCD panel 100' of FIG. 1A except that the first polymer film 307 and the second polymer film 308 disposed on two sides of the flat LCD panel 300' both are formed of a polyimide film containing curable reactive monomers.

When the flat LCD panel 300' is curved by a stress, as indicated in FIG. 3B, the optical axes $Z_{31}$ and $Z_{32}$ of the liquid crystal molecules 106a and 106b of the liquid crystal layer 106 directly contacting the first polymer film 307 and the second polymer film 308 are anchored on the surfaces of the first polymer film 307 and the second polymer film 308 respectively. Therefore, when the first substrate 102 and the second substrate 103 are relatively displaced by a stress (for example, LC molecules c and c' are shift to the left), the optical axes $Z_{31}$ and $Z_{32}$ of the liquid crystal molecules 106a and 106b disposed on two sides of the curved LCD panel 300 are dislocated towards opposite directions, so that an inverse domain is generated at the boundary region R3 between two adjacent alignment domains of the pixel area 301, the dark fringe at the boundary region R3 of the alignment domain is expanded, and extra dark fringes may further be generated.

Figure 4A:
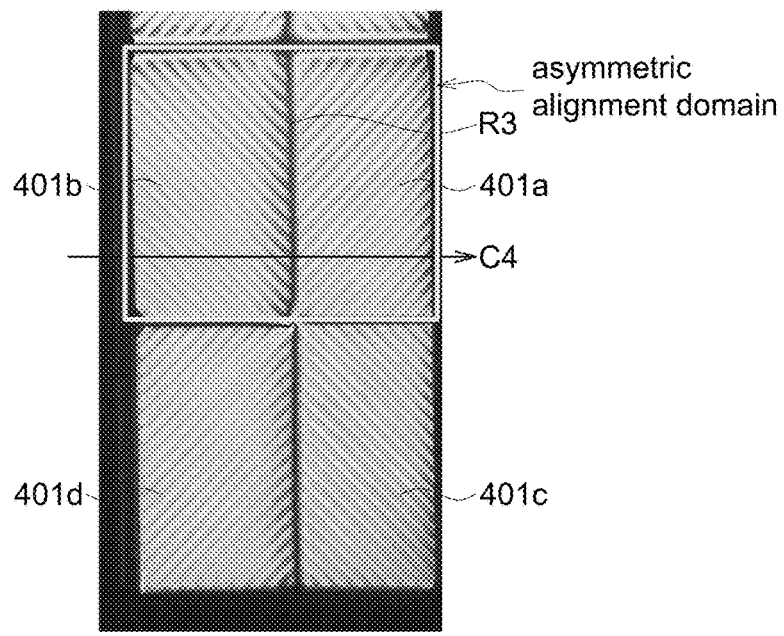
FIG. 4A is a display frame of one single pixel area illustrated by a generally known LCD panel in a bright state.
Figure 4B:
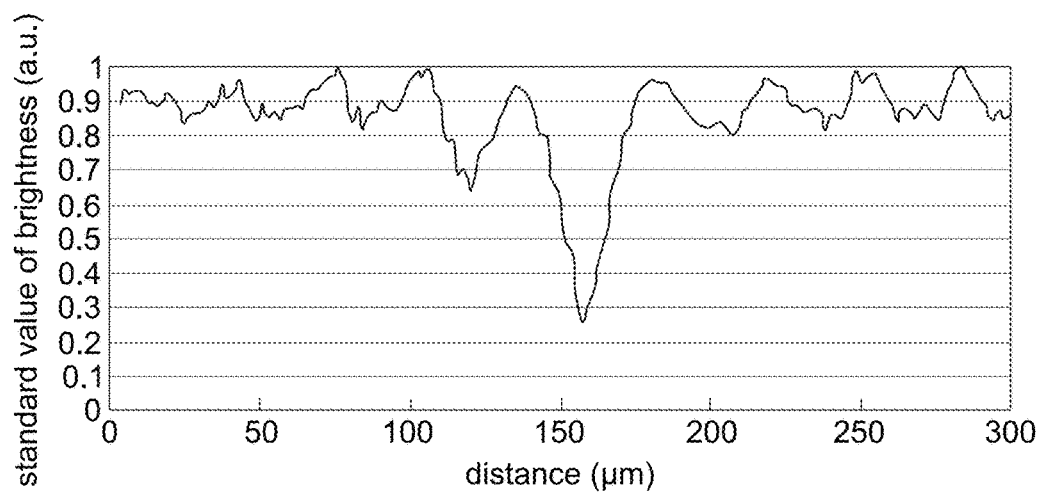
FIG. 4B is a brightness distribution diagram viewed along an arrow direction C4 of FIG. 4A.

Refer to FIG. 4A and FIG. 4B. FIG. 4A is a display frame of one single pixel area illustrated by a generally known LCD panel 400 in a bright state. FIG. 4B is a brightness distribution diagram viewed along an arrow direction C4 of FIG. 4A. As indicated in FIG. 4A, a pixel area 401 of the LCD panel 400 includes 4 alignment domains 401a, 401b, 401c and 401d. Due to the relative displacement of the first substrate 102 and the second substrate 103 caused by a stress, the adjacent alignment domains form an asymmetric pattern (as indicated in the border lines of FIG. 4A, alignment domains 401a and 401b are asymmetric with each other). Not only a dark fringe occurs at the boundary region between two adjacent alignment domains (such as the boundary region R3 between the alignment domains 401a and 401b) but also a plurality of addition dark fringes occur at the alignment domains 401a and 401b. As indicated in FIG. 4B, the brightness values of the dark fringes are substantially lower than 75% of the maximum brightness value of the curved LCD panel 400 in the brightest state. Moreover, the distribution of brightness values in the alignment domains 401a and 401b is very non-uniform, and the width of the dark fringe occurring at the boundary region R3 between adjacent alignment domains 401a and 401b is expanded. This implies that after the first substrate 102 and the second substrate 103 of the LCD panel 400 are relatively displaced by the stress, the display quality deteriorates significantly. Similarly, after the curved LCD panel 400 is curved by the stress, the deterioration in the display quality will be even worse.

To summarize, although the alignment domains in the pixel area 101 form an asymmetric pattern when the curved LCD panel 100 of FIG. 1B is curved by a stress, the curved LCD panel 100 of FIG. 1B does not generate extra dark fringes in the boundary region R1 between adjacent alignment domains, and the display quality of the curved LCD panel 100 is not affected. In comparison, after the top and bottom substrates of the generally known LCD panel 400 (the first substrate 102 and the second substrate 103) are relatively displaced by a stress; much more dark fringes with increased widths are generated at the boundary region R3 between adjacent alignment domain 401a and 401b. Thus, the curved LCD panel 100 according to some embodiments of the invention is capable of resolving the problem of the conventional curved LCD panel 400 having deteriorated display quality.

Figure 5:
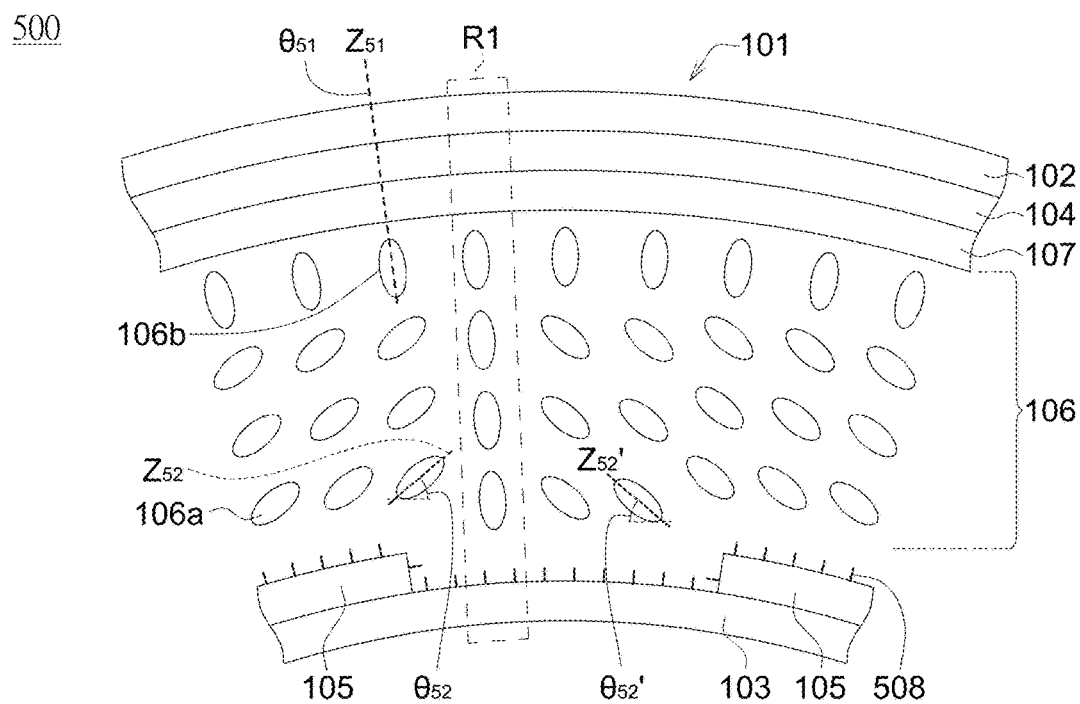
FIG. 5 is a cross-sectional view of the structure of a curved LCD panel according to another embodiment of the invention.

Referring to FIG. 5, a cross-sectional view of the structure of a curved LCD panel 500 according to another embodiment of the invention is shown. The structure of the curved LCD panel 500 is similar to the structure of the curved LCD panel 100 of FIG. 1B except that the second polymer film 508 of the curved LCD panel 500 can be realized by a polymer-stabilized alignment (PSA) polymer layer.

The second polymer film 508 is not formed by directly coating a polymer material on the second electrode layer 105 by way of spin coating or printing. Firstly, the liquid crystal material is mixed with curable reactive monomers, such as acrylic monomers. Then, a voltage is applied to the liquid crystal layer 106 through the first electrode layer 104 and the second electrode layer 105, such that phase disengagement is induced between the liquid crystal molecules 106b of the liquid crystal layer 106 disposed adjacent to the second electrode layer 105 and the acrylic monomers, a polyimide film of liquid crystal molecules is formed on the surface of the second electrode layer 105, and the optical axis $Z_{52}$ and $Z_{52}'$ of the polymerized liquid crystal molecules 106b are arranged according to predetermined angles such as pre-tilt angles $\theta_{52}$ and $\theta_{52}'$.

In the present embodiment, by controlling the radiation angle, position and dose of a UV light, the polyimide film of the liquid crystal molecules is only formed on the surface 105a of the second electrode layer 105. Also, polyimide film without containing curable reactive monomers is formed to serve as the first polymer film 107, such that the optical axis $Z_{51}$ of the liquid crystal molecules 106a disposed adjacent to the first electrode layer 104 will not be anchored on the surface of the first polymer film 107. Therefore, after the first substrate 102 and the second substrate 103 are relatively displaced by a stress, the optical axis $Z_{51}$ of the liquid crystal molecules 106a is still perpendicular to the first substrate 102. That is, the pre-tilt angle $\theta_{51}$ between the optical axis $Z_{51}$ of the liquid crystal molecules 106a of the liquid crystal layer 106 disposed adjacent to the first electrode layer 104 and the first substrate 102 is still 90°. The structures and manufacturing processes of other components of the curved LCD panel 500 are already described in above disclosure, and are not repeated here.

Based on the above disclosure, an LCD panel is provided in an embodiment of the invention. Two electrode layers are formed on two opposite surfaces of two glass substrates of the LCD panel, and two types of polymer films are respectively formed on the electrode layers for aligning the liquid crystal layer disposed between the two electrode layers. Since the two types of polymer films have different chemical compositions, the liquid crystal molecules of the liquid crystal layer disposed adjacent to the two sides respectively have different pre-tilt angles. In some embodiments of the invention, the liquid crystal molecules disposed adjacent to the electrode layer with a larger aperture density have a smaller pre-tilt angle. In some other embodiments of the invention, the difference in the chemical compositions of the two types of polymer films can be verified through the characteristic absorption peaks of the IR light absorption spectrum within the wavenumber range of 800 $cm^{-1}$~2000 $cm^{-1}$.

In some embodiments of the invention, the two types of polymer films are used in a multi-domain vertically alignment (MVA) LCD panel with wide viewing angle. The LCD panel in which the liquid crystal molecules of the electrode layers disposed adjacent to the two sides of the LCD panel have different pre-tilt angles resolves the problems occurring during the manufacturing process of the generally known LCD panel. That is, during the manufacturing process, when the glass substrates receive a stress, the optical axis of the anchored liquid crystal molecules is dislocated, and an inverse domain is generated at the boundary between adjacent asymmetric alignment domains.

According to some embodiments, when the LCD panel is in a brightest state, at the boundary between adjacent asymmetric alignment domains, only one dark fringe, having a brightness value lower than 75% of the maximum brightness value of the LCD panel in the brightest state, is present. Therefore, dark fringe will not expand and no additional dark fringe having such low brightness is generated. Thus, the problem of the generally known LCD panel having poor display quality can be resolved. When the LCD panels of the embodiments are used as a curved LCD panel, the display quality of the generally known LCD panel can be further significantly improved.

While the invention has been described by way of example and in terms of the preferred embodiment (s), it is to be understood that the invention is not limited thereto. On the contrary, it is intended to cover various modifications and similar arrangements and procedures, and the scope of appended claims therefore should be accorded the broadest interpretation so as to encompass all such modifications and similar arrangements and procedures.

What is claimed is:

1. A liquid crystal display (LCD) panel having at least one pixel area and comprising:
    a first electrode layer disposed in the pixel area;
    a second electrode layer disposed in the pixel area;
    a liquid crystal layer disposed between the first electrode layer and the second electrode layer, wherein liquid crystal molecules of the liquid crystal layer disposed adjacent to the first electrode layer have a first pre-tilt angle, and liquid crystal molecules of the liquid crystal layer disposed adjacent to the second electrode layer have a second pre-tilt angle different from the first pre-tilt angle;
    a first polymer film disposed between the liquid crystal layer and the first electrode layer, contacting the liquid crystal layer; and
    a second polymer film disposed between the liquid crystal layer and the second electrode layer and contacting the liquid crystal layer;
    wherein one of the first polymer film and second polymer film includes a plurality of curable molecules.

2. The LCD panel according to claim 1, wherein the LCD panel is a curved LCD panel having a curved first side, and the first side has at least one curvature radius between 500~10000 mm.

3. The LCD panel according to claim 1, wherein the liquid crystal layer is a vertical alignment liquid crystal layer.

4. The LCD panel according to claim 1, wherein the first pre-tilt angle is substantially equal to 90°, and the second pre-tilt angle is greater than or equal to 80° but less than 89.9°.

5. The LCD panel according to claim 1, wherein the first electrode layer has at least one first aperture, the second electrode layer has at least one second aperture, and the second electrode layer has an aperture density greater than that of the first electrode layer.

6. The LCD panel according to claim 1, wherein the first electrode layer is a common electrode, the second electrode layer is a pixel electrode.

7. An LCD panel having at least one pixel area and comprising:
  a first electrode layer disposed in the pixel area;
  a second electrode layer disposed in the pixel area;
  a liquid crystal layer disposed between the first electrode layer and the second electrode layer;
  a first polymer film disposed between the liquid crystal layer and the first electrode layer and contacting the liquid crystal layer; and
  a second polymer film disposed between the liquid crystal layer and the second electrode layer and contacting the liquid crystal layer;
  wherein the first polymer film has an IR light absorption spectra with characteristic absorption peaks within a wavenumber range of 800 $cm^{-1}$~2000 $cm^{-1}$ different from that of the second polymer film; wherein one of the first polymer film and second polymer film includes a plurality of curable molecules.

8. An LCD panel having at least one pixel area, wherein the LCD panel comprises:
  a first electrode layer disposed in the pixel area;
  a second electrode layer disposed in the pixel area; and
  a liquid crystal layer disposed between the first electrode layer and the second electrode layer and comprising a plurality of first liquid crystals with a first alignment direction and a plurality of second liquid crystals with a second alignment direction, wherein in the pixel area, the second liquid crystals occupy an area larger than that occupied by the first liquid crystals, and an asymmetric alignment domains region is formed by the first and the second liquid crystals;
  a first polymer film disposed between the liquid crystal layer and the first electrode layer, contacting the liquid crystal layer; and
  a second polymer film disposed between the liquid crystal layer and the second electrode layer and contacting the liquid crystal layer;
  wherein when the LCD panel is in a brightest state, the asymmetric alignment domains region includes only one dark fringe having a brightness value lower than 75% of the maximum brightness value of the LCD panel in the brightest state; wherein one of the first polymer film and second polymer film includes a plurality of curable molecules.

* * * * *